United States Patent
Merchlinsky (10) Patent No.: US 11,196,456 B2
(45) Date of Patent: *Dec. 7, 2021

(54) FLEXIBLE REDUNDANCY USING RF SWITCH MATRIX

(71) Applicant: Hughes Network Systems, LLC, Germantown, MD (US)

(72) Inventor: Joseph Merchlinsky, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/842,728

(22) Filed: Apr. 7, 2020

(65) Prior Publication Data

US 2020/0235778 A1     Jul. 23, 2020

Related U.S. Application Data

(63) Continuation of application No. 16/140,429, filed on Sep. 24, 2018, now Pat. No. 10,615,843, and a
(Continued)

(51) Int. Cl.
*H04B 1/74* (2006.01)
*H04L 1/22* (2006.01)
(Continued)

(52) U.S. Cl.
CPC ........... *H04B 1/74* (2013.01); *H04B 7/18519* (2013.01); *H04L 1/203* (2013.01); *H04L 1/22* (2013.01);
(Continued)

(58) Field of Classification Search
CPC .............. H04B 7/18515; H04B 7/1851; H04B 7/18519; H04B 1/74; H04L 1/203;
(Continued)

(56) References Cited

U.S. PATENT DOCUMENTS

| 4,739,247 A | 4/1988 | Cisco et al. |
| 5,446,370 A | 8/1995 | Voight |

(Continued)

FOREIGN PATENT DOCUMENTS

| CN | 201708798 U | 1/2011 |
| DE | 10260111 A1 | 7/2004 |

(Continued)

OTHER PUBLICATIONS

International Search Report and Written Opinion dated Mar. 10, 2017 by the International Searching Authority (European Patent Office) in PCT Application PCT/US2016/064408.
(Continued)

*Primary Examiner* — Rownak Islam
(74) *Attorney, Agent, or Firm* — NovoTechIP International PLLC (57) ABSTRACT

Techniques including controlling coupling and uncoupling of RF ports included in an RF switch matrix including first-side RF ports and second-side RF ports, where each of the first-side RF ports is configured to be selectively coupled to at least one of two or more of the second-side RF ports, identifying one or more of the second-side RF ports as active ports including an active port, causing the RF switch matrix to couple the active port to a signal port included in the first-side RF ports, obtaining at least one of a bit error rate and a signal to noise ratio for a demodulation of an RF stream received via the active port, and causing, in response to at least one of the bit error rate or the signal to noise ratio, the RF switch matrix to couple the signal port to a spare port included in the second-side RF ports.

20 Claims, 8 Drawing Sheets

Related U.S. Application Data continuation of application No. 14/956,353, filed on Dec. 1, 2015, now Pat. No. 10,084,509.

(51) Int. Cl.
  *H04L 1/20* (2006.01)
  *H04B 7/185* (2006.01)
  *H04Q 1/24* (2006.01)
  *H04Q 3/52* (2006.01)
  *H04W 24/00* (2009.01)

(52) U.S. Cl.
  CPC ............... *H04Q 1/24* (2013.01); *H04Q 3/521* (2013.01); *H04W 24/00* (2013.01); *H04Q 2213/1302* (2013.01); *H04Q 2213/1304* (2013.01); *H04Q 2213/13098* (2013.01)

(58) Field of Classification Search
  CPC . H04L 1/22; H04Q 1/24; H04Q 3/521; H04Q 2213/1302; H04Q 2213/1304; H04Q 2213/13098; H04W 24/00
  USPC .................................................. 370/217, 220
  See application file for complete search history.

(56) References Cited

U.S. PATENT DOCUMENTS

| | | | |
|---|---|---|---|
| 5,596,269 | A | 1/1997 | Miller |
| 6,202,088 | B1 | 3/2001 | Corrigan |
| 6,728,554 | B1 | 4/2004 | Wegner |
| 6,973,287 | B2 | 12/2005 | Franzen et al. |
| 7,019,882 | B1 | 3/2006 | Wilson |
| 7,805,165 | B2 | 9/2010 | Tsai et al. |
| 2004/0155725 | A1* | 8/2004 | Kwiatkowski ............ H01P 1/12 333/101 |
| 2006/0121847 | A1 | 6/2006 | Tsai et al. |
| 2006/0250197 | A1* | 11/2006 | Petrovic .................... H01P 1/15 333/101 |
| 2009/0161768 | A1 | 6/2009 | Park |
| 2010/0272113 | A1 | 10/2010 | Luders |
| 2011/0269416 | A1 | 11/2011 | Kadoi et al. |
| 2012/0064823 | A1 | 3/2012 | Chen |
| 2013/0121684 | A1 | 5/2013 | Smith |
| 2013/0148570 | A1 | 6/2013 | Miller |
| 2013/0271236 | A1 | 10/2013 | Baldor |
| 2016/0065136 | A1 | 3/2016 | Phelps et al. |

FOREIGN PATENT DOCUMENTS

| | | |
|---|---|---|
| EP | 1328076 A2 | 7/2003 |
| WO | 9509484 A1 | 4/1995 |

OTHER PUBLICATIONS

International Search Report and Written Opinion dated Feb. 17, 2017 by the International Searching Authority (European Patent Office) in PCT Application PCT/US2016/064490.

EP Communication dated May 27, 2019 in corresponding European Patent Application No. 16816519.9.

USPTO Office Action dated Nov. 7, 2016 for App. U.S. Appl. No. 14/956,363.

* cited by examiner

FLEXIBLE REDUNDANCY USING RF SWITCH MATRIX

CROSS-REFERENCE TO A RELATED APPLICATION

This application is a continuation of pending U.S. patent application Ser. No. 16/140,429, filed on Sep. 24, 2018, and entitled "Flexible Redundancy Using RF Switch Matrix," which is a continuation of U.S. patent application Ser. No. 14/956,353, filed on Dec. 1, 2015, and entitled "Flexible Redundancy Using RF Switch Matrix," and which issued as U.S. Pat. No. 10,084,509 B2 on Sep. 25, 2018, both of which are hereby incorporated by reference herein in their entirety.

BACKGROUND

For maintaining high availability for RF communication systems, such as satellite gateways, it is necessary to have redundant pieces of RF communication equipment which can take over for a piece of equipment that fails. For example, with satellite gateways, conventional techniques for deploying redundant modems include 1:1 sparing or 1:n sparing on each L-Band interface to a Radio Frequency Terminal (RFT). Such techniques involve using combiners in the transmit path and splitter in the receive path, which requires redundant modems on each L-Band RFT interface.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
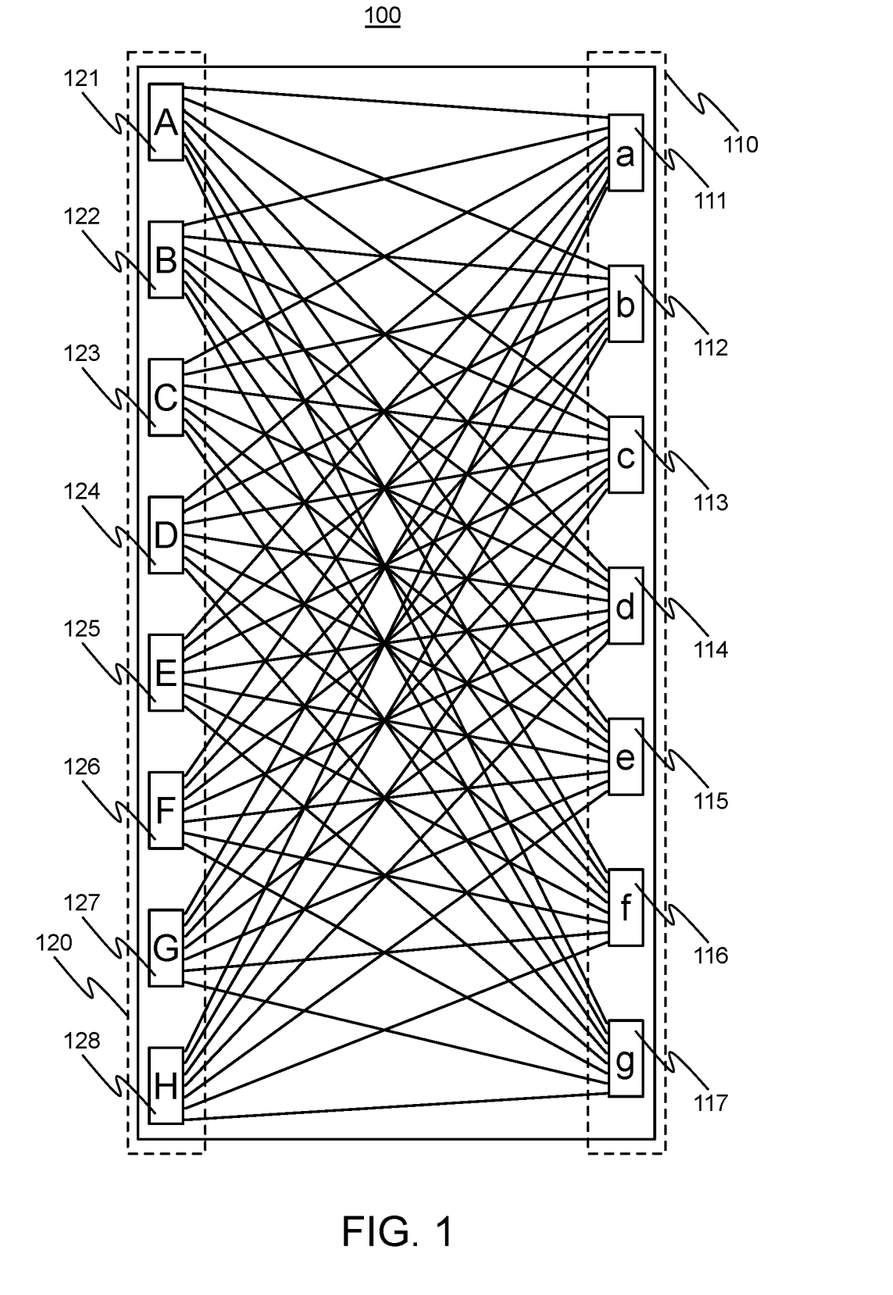
FIG. 1 illustrates a high-level schematic diagram of an example of an RF switch matrix.

FIG. 1 illustrates a high-level schematic diagram of an example of an RF switch matrix 100. RF switch matrix 100 is an M by N switch matrix comprising N first-side RF ports 110 and M second-side RF ports 120. In the example illustrated in FIG. 1, M has a value of 7, and N has a value of 8, although other values for M and N are acceptable. Thus, RF switch matrix 100 includes 7 first-side RF ports 110. The 7 first-side RF ports 110 include first-side RF port 111 (labeled "a" throughout the drawings), first-side RF port 112 (labeled "b" throughout the drawings), first-side RF port 113 (labeled "c" throughout the drawings), first-side RF port 114 (labeled "d" throughout the drawings), first-side RF port 115 (labeled "e" throughout the drawings), first-side RF port 116 (labeled "f" throughout the drawings), and first-side RF port 118 (labeled "g" throughout the drawings). Also, RF switch matrix 100 includes 8 second-side RF ports 120. The 8 second-side RF ports 120 include second-side RF port 121 (labeled "A" throughout the drawings), second-side RF port 122 (labeled "B" throughout the drawings), second-side RF port 123 (labeled "C" throughout the drawings), second-side RF port 124 (labeled "D" throughout the drawings), second-side RF port 125 (labeled "E" throughout the drawings), second-side RF port 126 (labeled "F" throughout the drawings), second-side RF port 127 (labeled "G" throughout the drawings), and second-side RF port 128 (labeled "H" throughout the drawings).

With the RF switch matrix 100, each of the first-side RF ports 110 may be selectively coupled to at least two or more of the second-side RF ports 120. When a first-side RF port 110 has been selectively coupled to a second-side RF port 120, an RF signal may be carried between the two ports. When a first-side RF port 110 is not coupled to a second-side RF port 120, an RF signal may substantially not be carried between the two ports. Much as a first-side RF port 110 can be coupled to a second-side RF port 120, the two coupled ports can also be uncoupled again. In the particular example illustrated in FIG. 1, each of the first-side RF ports 110 is capable of being coupled with each of the eight second-side RF ports 120, as illustrated by the lines passing between the ports. In some implementations, a first-side RF port 110 may be capable of being coupled to two or more, but not all of, the second-side RF ports 120. In some implementations, a first-side RF port 110 may include or be accompanied by switching elements (not illustrated) for selectively coupling and uncoupling the first-side RF port 110 with various second-side RF ports 120. In this disclosure, terms such as "couple," "coupled," "couples," "coupling," "uncouple," "uncoupled," "uncouples," and "uncoupling" are symmetric; for example, the statement that "the controller causes first-side RF port 113 to be coupled to second-side RF port 122" is equivalent to the statement that "the controller causes second-side RF port 122 to be coupled to first-side RF port 113," and no particular meaning is to be ascribed in which the two coupled RF ports are mentioned.

In some circumstances, a single first-side RF port 110 may not be coupled to any of the second-side RF ports 120. FIG. 3(a) illustrates an example in which all of the first-side RF ports a-g are not coupled to any of the second-side RF ports A-H (as indicated by "NC" next to the uncoupled ports). In some circumstances, a single first-side RF port 110 may be coupled to a single second-side RF port 120. FIG. 3(b) illustrates an example in which each of first-side RF ports a, b, c, d, and e are connected to respective second-side RF ports A, B, E, C, and D. In some implementations, a single first-side RF port 110 may be simultaneously coupled to two or more second-side RF ports 120. FIG. 4(b) illustrates an example in which first-side RF port b is simultaneously coupled to two second-side RF ports B and F. One situation where it may be useful to couple a single first-side RF port 110 to multiple second-side RF ports is utilizing two data demodulators operating at different frequency bands from a single RF signal. Another situation is where a single transmitting antenna is used to transmit signals in different frequency bands, and separate pieces of RF communication equipment, such as data modulators, are coupled to respective second-side RF ports 120 that themselves are coupled to a single first-side RF port 110.

The first-side RF ports 110 may be configured, or optimized, for serving as RF inputs, and the second-side RF ports 120 may be configured, or optimized, for serving as RF outputs. Such implementations may include active components along the signal paths among and between the first-side RF ports 110 and second-side RF ports 120 that preclude bidirectional RF signaling. For example, the RF ports of receive RF switch matrix 215 illustrated in FIG. 2 might be configured in this manner.

The first-side RF ports 110 may be configured, or optimized, for serving as RF outputs, and the second-side RF ports 120 may be configured, or optimized, for serving as RF inputs. Such implementations may include active components along the signal paths among and between the first-side RF ports 110 and second-side RF ports 120 that preclude bidirectional RF signaling. For example, the RF ports of transmit RF switch matrix 210 illustrated in FIG. 2 might be configured in this manner. In some implementations, RF signals may be sent in both directions between a first-side RF port 110 and a second-side RF port 120 that are coupled together.

Figure 2:
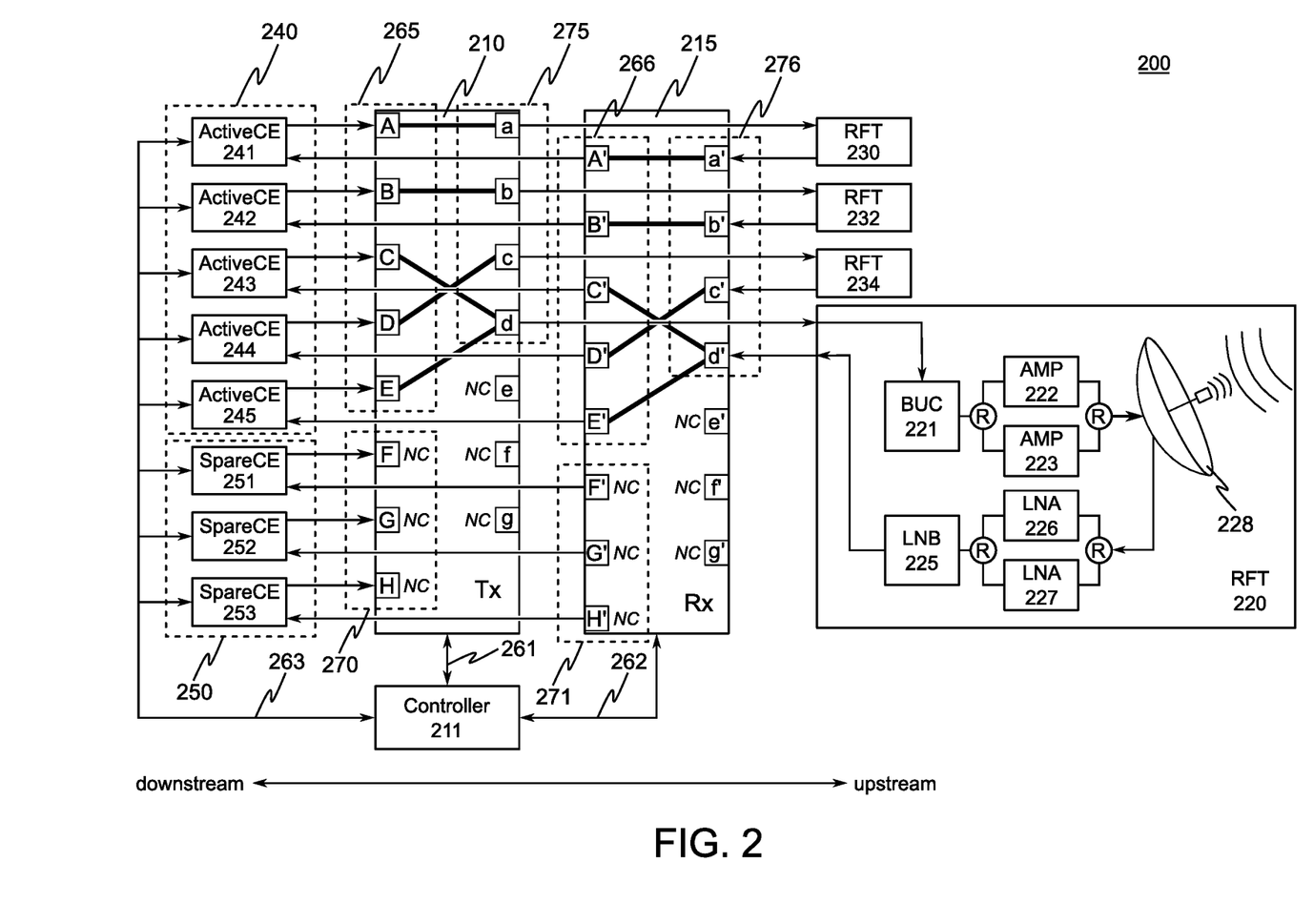
FIG. 2 illustrates an example of an RF system including a transmit RF switch matrix and a receive RF switch matrix.

FIG. 2 illustrates an example of an RF system 200 including a transmit RF switch matrix 210 and a receive RF switch matrix 215. The particular example illustrated in FIG. 2 is adapted for satellite data communication. However, this merely serves as an example, and the subject matter described in this disclosure is not limited to satellite data communications, but is more broadly applicable to other RF communication systems. The illustrated transmit RF switch matrix 210 is a 7 by 8 switch RF matrix. The illustrated receive RF switch matrix 215 is also a 7 by 8 switch RF matrix. Other values of M and N may be used. Although in the particular example illustrated in FIG. 2 the values of M and N are the same for transmit RF switch matrix 210 and receive RF switch matrix 215, in some implementations, these two switch matrices could have different values of M and/or N. In FIG. 2, transmit RF switch matrix 210 is configured such that first-side RF port a is coupled with second-side RF port A, first-side RF port b is coupled with second-side RF port B, first-side RF port c is coupled with second-side RF port D, and first-side RF port d is simultaneously coupled with second-side RF ports C and E. Also, receive RF switch matrix 215 is configured such that first-side RF port a' is coupled with second-side RF port A', first-side RF port b' is coupled with second-side RF port B', first-side RF port c' is coupled with second-side RF port D', and first-side RF port d' is simultaneously coupled with second-side RF ports C' and E'. As discussed below, system 200 is configured such that coupling and uncoupling of RF ports in transmit RF switch matrix 210 are reflected in receive RF switch matrix 215 and/or vice-versa. In some implementations, the two RF switch matrices 210 and 215 may be replaced with a single RF switch matrix, for example, a 14 by 16, or even an 8 by 16, RF switch matrix.

First-side RF ports a-d and a'-d' are coupled to RFTs (radio frequency terminals) 220, 230, 232, and 234. More specifically, an RF input of RFT 230 is coupled to first-side RF port a, and an RF output of RFT 230 is coupled to first-side RF port a; an RF input of RFT 232 is coupled to first-side RF port b, and an RF output of RFT 232 is coupled to first-side RF port b; an RF input of RFT 234 is coupled to first-side RF port c, and an RF output of RFT 234 is coupled to first-side RF port c; and RF input of RFT 220 is coupled to first-side RF port d, and an RF output of RFT 220 is coupled to first-side RF port d'. First-side RF ports e, f, g, e', f, and g' remain uncoupled, as indicated by the "NC" labels.

FIG. 2 illustrates specific elements of RFT 220. Block upconverter (BUC) 221 is coupled to first-side RF port d of transmit RF switch matrix 210, from which BUC 221 receives RF signals modulated by the pieces of active RF communication equipment 243 and 245. An output of BUC 221 is supplied to inputs of redundant high-power amplifiers 222 and 223, the output of which is supplied to satellite dish 228 for transmission to a satellite. RF signals received by satellite dish 228 are supplied to redundant low-noise amplifiers (LNAs), the output of which is supplied to low-noise block downconverter (LNB) 225. The output of LNB 225 is coupled to first-side RF port d' of receive RF switch matrix 215. There are many other well-known configurations for RFTs for satellite communication. Each of RFTs 230, 232, and 234 may be configured in much the same manner as RFT 220.

RF system 200 also includes active pieces of RF communication equipment 240 and spare pieces of RF communication equipment 250, each of which is coupled to respective second-side RF ports of transmit RF switch matrix 210 and receive RF switch matrix 215. An RF output of an active piece of RF communication equipment 241 is coupled to second-side RF port A, and an RF input of the active piece of RF communication equipment 241 is coupled to second-side RF port A'. An RF output of an active piece of RF communication equipment 242 is coupled to second-side RF port B, and an RF input of the active piece of RF communication equipment 242 is coupled to second-side RF port B'. An RF output of an active piece of RF communication equipment 243 is coupled to second-side RF port C, and an RF input of the active piece of RF communication equipment 243 is coupled to second-side RF port C'. An RF output of an active piece of RF communication equipment 244 is coupled to second-side RF port D, and an RF input of the active piece of RF communication equipment 244 is coupled to second-side RF port D'. An RF output of an active piece of RF communication equipment 245 is coupled to second-side RF port E, and an RF input of the active piece of RF communication equipment 245 is coupled to second-side RF port E'.

An RF output of a spare piece of RF communication equipment 251 is coupled to second-side RF port F, and an RF input of the spare piece of RF communication equipment 251 is coupled to second-side RF port F'. An RF output of a spare piece of RF communication equipment 252 is coupled to second-side RF port G, and an RF input of the spare piece of RF communication equipment 252 is coupled to second-side RF port G'. An RF output of a spare piece of RF communication equipment 253 is coupled to second-side RF port H, and an RF input of the spare piece of RF communication equipment 253 is coupled to second-side RF port H'.

Pieces of RF communication equipment coupled to second-side RF ports may be in one of following four modes, although some implementations may not utilize all four modes and/or have additional modes. For the purpose of conveniently discussing these modes, FIG. 2 indicates "upstream" and "downstream" directions, although it is recognized that in some other contexts these labels may conventionally be reversed. The first mode is an "active" mode, in which a piece of RF communication equipment is coupled to a second-side RF port that is coupled to a first-side RF port, is in active service (such as, but not limited to, demodulating an input RF signal or modulating data to produce an out RF signal), and is providing demodulated data to a downstream device (not illustrated) and/or transmitting modulated data.

The second mode is a "spare" mode, in which a piece of RF communication equipment is not in active service (which may involve the piece of RF communication equipment being put into, for example, a power saving mode, a sleep mode, or unpowered), but RF system 200 is prepared to use the piece of RF communication equipment as a replacement for an active piece of RF communication equipment. For example, if RF system 200 identifies an error in the operation in the active piece of RF communication equipment 242, RF system 200 may couple second-side RF port F to first-side RF port b, couple second-side RF port F' to b', and uncouple second-side RF ports B and B'. This would replace the active piece of RF communication equipment 242 with the spare piece of RF communication equipment 251, at which point spare piece of RF communication equipment 251 would transition into the active mode. However, as discussed in more detail below, there are other circumstances in which a piece of RF communication equipment may be transitioned from the spare mode to the active or hot spare modes. Although in the example illustrated in FIG. 2 each of the spare pieces of RF communication equipment 251-253 are unconnected (as indicated by the "NC" labels), in some implementations an inactive transmit component, such as the spare piece of RF communication equipment 251, may be coupled to a piece of test equipment (not illustrated) that periodically monitors the health of the transmit component when it is not in use.

The third mode is a "hot spare" mode, in which a piece of RF communication equipment is in active service, but is not providing demodulated data available to a downstream device or transmitting modulated data in an RF signal conveyed via an RF switch matrix. In this mode, the second-side RF ports for both a hot spare piece of RF communication equipment and an active piece of RF communication equipment may be simultaneously coupled to the same first-side RF ports. FIG. 5(e) illustrates an example in which second-side RF ports C and F are simultaneously coupled to first-side RF port c, thus allowing S1 to serve as a hot spare for A1. In some implementations, transmission by a hot spare piece of RF communication equipment may be prevented by not coupling a second-side RF port coupled to the hot spare piece of RF communication equipment in transmit RF switch matrix 215, thus avoiding hot spare piece of RF communication equipment from interfering with its respective active piece of RF communication equipment.

The fourth mode is an "offline" mode, in which a piece of RF communication equipment is not in active service, and is designated not for use as a spare. A piece of RF communication equipment may be placed into offline mode after encountering issues with operating the piece of RF communication equipment suggesting it may require repair or replacement. Other circumstances, such as, but not limited to, scheduled or intentional maintenance, may result in a piece of RF communication equipment being placed in the offline mode.

Figure 8:
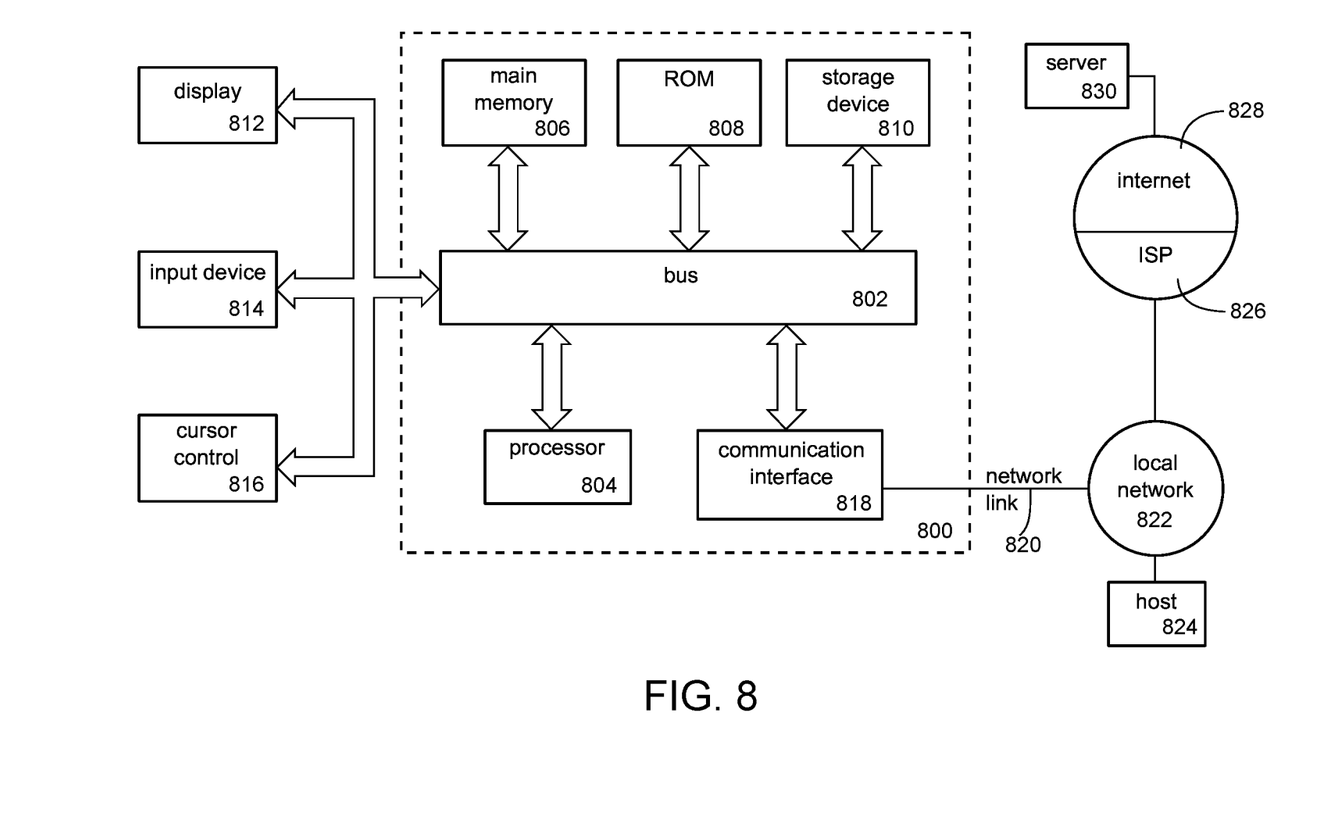
FIG. 8 is a block diagram that illustrates a computer system upon which aspects of this disclosure may be implemented

RF system 200 also includes controller 260, which in some implementations may also be referred to and/or implemented as a control unit, a switch control unit, a switch matrix control unit, a switch controller, a switch matrix controller, a switch processor, a switch matrix processor, or a microprocessor unit. The discussion of FIG. 8 provides various suitable implementations for controller 260. Controller 260 is adapted to control RF switch matrices 210 and 215, such as by automatically instructing and/or causing RF switch matrices 210 and 215 to couple and uncouple various first-side RF ports and second-side RF ports. Controller 260 interacts with and controls the operation of transmit RF switch matrix 210 via interface 261, and controller 260 interacts with and controls the operation of receive RF switch matrix 215 via interface 262. Additionally, controller 260 is adapted to obtain information regarding, and in some implementations control the operation of, RF communication equipment coupled to the second-side ports of the RF switch matrices. Controller 260 interacts with and controls the operation of pieces of RF communication equipment 240 and 250 via interface 263. Interfaces 261, 262, and 263 may each comprise individual connections, a single bus, a data communication network, or other data communication mechanisms. In some implementations, controller 260 may also be adapted to interact with and/or control the operation of RFTs 220, 230, 232, and 234.

Controller 260 may be configured to control various elements of RF system 200 to perform operations, such as the various operations illustrated in FIGS. 3-7, by way of instructions included in nontransitory computer readable medium including instructions and data which cause one or more processors included in controller 260 to perform the operations. As part of those operations, controller 260 may identify particular second-side RF ports as active ports, such as active ports 265 and 266, which are each coupled to the active pieces of RF communication equipment 240. Additionally, controller 260 may identify particular second-side RF ports as spare ports, such as spare ports 270 and 271, which are each coupled to the spare pieces of RF communication equipment 250. Additionally, controller 260 may identify particular first-side RF ports as signal ports, suitable for being coupled and uncoupled with active and spare ports, such as signal ports 275 and 276, which are coupled to RFTs 220, 230, 232, and 234 as illustrated in FIG. 2 and discussed above. In some implementations, transmit RF switch matrix 210, receive RF switch matrix 215, and controller 260 may be combined within a single housing or enclosure.

FIGS. 3-7 provide simplified illustrations of control of an RF switch matrix, such as transmit RF switch matrix 210 or receive RF matrix 215, by a controller, such as controller 260. However, it should be understood that the elements illustrated in FIGS. 3-7 are included in a larger RF system, such as RF system 200. Additionally, although only one RF switch matrix is illustrated in each of the drawings in FIGS. 3-7, it is understood that there may be two, or more, RF switch matrices, such as is illustrated in FIG. 2, although other configurations of multiple RF switch matrices and other elements coupled thereto are within the scope of this disclosure. In some implementations where an RF system includes a first RF switch matrix and a second RF switch matrix, a controller, such as controller 260, may be configured to maintain a one-to-one correspondence between couplings and uncouplings of ports in the first and second RF switch matrices. For example, in FIG. 4(b), in association with a controller causing spare port F to be coupled to signal port b, the controller would likewise cause spare port F' to be coupled to signal port b'. As another example, in FIG. 4(c), in association with the controller causing active port B to be uncoupled from signal port b, the controller would likewise cause active port B' to be uncoupled from signal port b', for an implementation involving a second RF switch matrix, such as the example illustrated in FIG. 2 with a first RF switch matrix 210 and a second RF switch matrix 215. It is also understood that as the illustrated RF switch matrices are under the control of a controller, such as controller 260, the controller is a cause, and thus causes, certain operations, including, but not limited to, coupling and uncoupling of RF ports, to occur. It is understood that variations on the particular sequences of operations discussed for FIGS. 3-7 can be made and still obtain the same or similar results. Such variations are within the scope of this disclosure.

Figure 3:
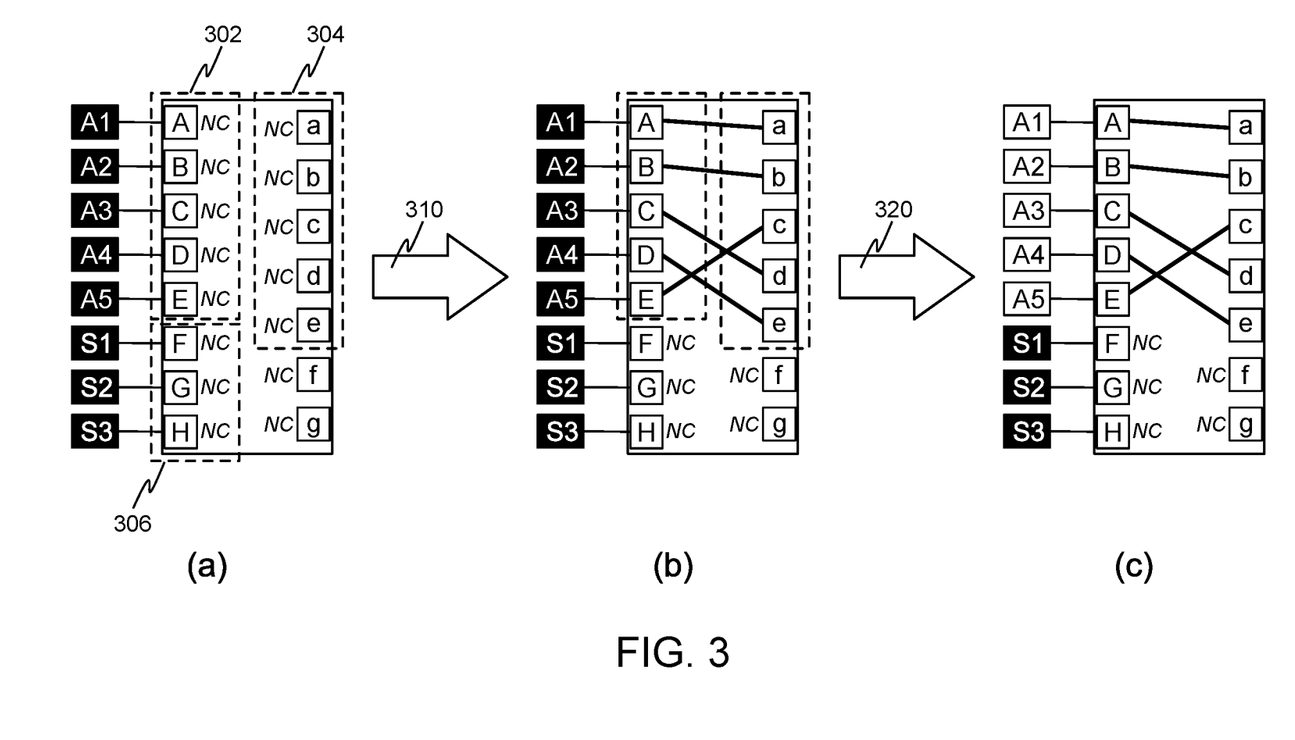
FIG. 3 illustrates an example of an initialization sequence for a communication apparatus including an RF switch matrix.

FIG. 3 illustrates an example of an initialization sequence for a communication apparatus including an RF switch matrix. In FIG. 3, an active piece of RF communication equipment A1 is coupled to second-side RF port A; for example, the two may be coupled by cabling. Some examples of pieces of RF communication equipment include, but are not limited to, modems, modulators, and demodulators. Additionally, an active piece of RF communication equipment A2 is coupled to second-side RF port B, an active piece of RF communication equipment A3 is coupled to second-side RF port C, an active piece of RF communication equipment A4 is coupled to second-side RF port D, an active piece of RF communication equipment A5 is coupled to second-side RF port E, a spare piece of RF communication equipment S1 is coupled to second-side RF port F, a spare piece of RF communication equipment S2 is coupled to second-side RF port G, and a spare piece of RF communication equipment S3 is coupled to second-side RF port H. FIGS. 4-7 also illustrate examples in which pieces of RF communication equipment are similarly coupled to RF switch matrices and are similarly labeled.

In FIG. 3(a), an initial state of the RF switch matrix, such as after an initial power on, is that all of the first-side and second-side RF ports are uncoupled (as indicated by neighboring "NC" (not coupled) labels) and each of the pieces of RF communication equipment are not in active service (as indicated by white text on a black background). At 310, based on configuration information obtained by a controller adapted to control the RF switch matrix, first-side RF ports a-e may be identified as signal ports 304, second-side RF ports A-E may be identified as active ports 302, and second-side ports F-H may be identified as spare ports 306. Additionally, based on the configuration information, signal port a is coupled to active port A, signal port b is coupled to active port B, signal port c is coupled to active port E, signal port d is coupled to active port C, and signal port e is coupled to active port D, as indicated by the lines connecting these RF ports in FIG. 3(b). Spare ports F-H are left uncoupled. At the end of 310, the RF system is configured as illustrated in FIG. 3(b). At 320, the controller causes each of the active pieces of RF communication equipment A1-A5 to enter active service (as indicated by black text on a white background). In some implementations, 320 may be performed before, or as part of 310. Each of the spare pieces of RF communication equipment S1-S3 is left inactive. At the end of 320, the system is configured as illustrated in FIG. 3(c).

Figure 4:
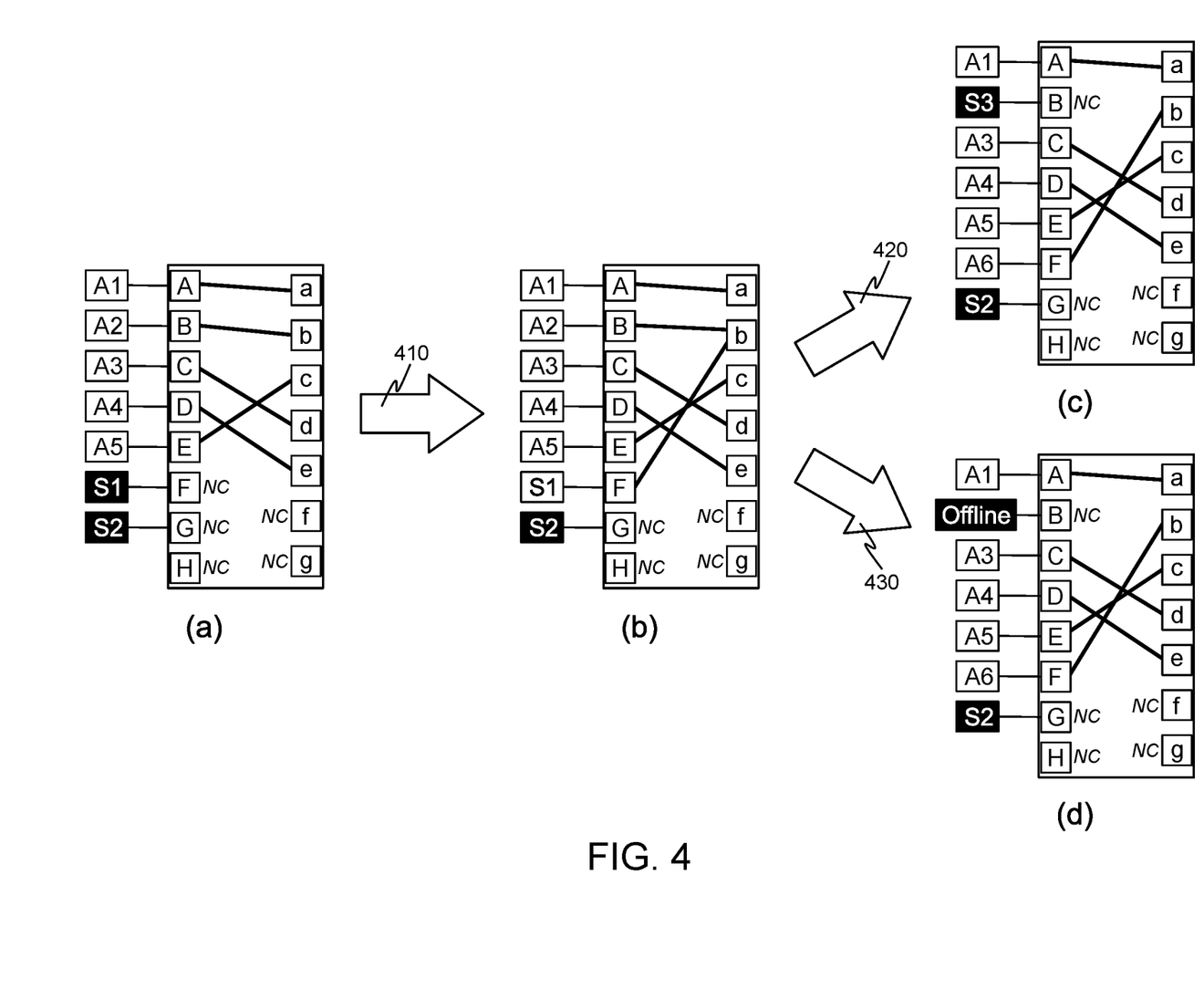
FIG. 4 illustrates examples in which an active terminal is replaced with a spare terminal.

FIG. 4 illustrates examples in which an active port is replaced with a spare port. In FIG. 4(a) the system is configured much as illustrated in FIG. 3(c), except there are only two spare ports F and G. At 410, a controller adapted to control the RF switch matrix obtains an indication of reduced performance for active piece of RF communication equipment A2, which is coupled to active port B. In some circumstances, the indication may be related to a complete or partial failure of A2. In some other examples, the indication may reflect a decrease in performance of A2. The controller may maintain record of performance information to generate such an indication. The indication may indicate that the performance of A2 is less than the performance of one or more than one of the other active pieces of RF communication equipment. In some examples, the indication may be initiated from outside of the elements illustrated in FIG. 2.

In response to the indication, the controller may select one of the spare ports S1-S3 to be coupled to signal port b, to which active port B is coupled. Various attributes of, or information about, the spare pieces of RF communication equipment may be factors considered in selecting one of multiple spare ports, such as, but not limited to, age (for example, time since manufacture or installation, and which is the newest or oldest), cumulative time in active service (such as which has the smallest or greatest amount of time in active service), performance (historical or current performance, and which has the best or worst performance), and the nature of the indication (which may affect, for example, whether the spare will initially be used as a hot spare). In the particular example illustrated in FIG. 4, spare port F is selected, and in response to having been selected, is coupled to signal port b. In some examples and circumstances, this may be to configure S1 to serve as a hot spare for A2, until another indication of reduced performance for A2 (in which case, S1 may replace A2), or another event or events that cause spare port F to be uncoupled from signal port b (such as, but not limited to, the controller determining spare port F is more urgently needed for another purpose).

Also, the controller causes spare piece of RF communication equipment S1 to enter active service. The controller may obtain operating parameters for A2, and may cause S1 to operate with the same or similar operating parameters. Such operating parameters may include, but are not limited to, a frequency range or frequency band in which A2 has been operated. At the end of 410, the system may be configured as illustrated in FIG. 4(b).

FIG. 4 illustrates two different sets of operations 420 and 430 that may follow from the configuration illustrated in FIG. 4(b). In some implementations, the set of operations 420 or the set of operations 430 may be selected in response to the obtained indication of reduced performance for A2. For example, if the indication indicates an aspect of A2, the set of operations 430 may be selected to take A2 offline. In some examples, S1 may not be used as a hot spare, and the set of operations 420 or the set of operations 430 may immediately follow the set of operations 410. In some examples, where S1 is being used as a hot spare, a controller adapted to control the RF switch matrix may proceed with the set of operations 420 or the set of operations 430 in response to obtaining a second indication of reduced performance for A2 (which may, for example, show a further reduction in the performance of A2, or that A2 is performing worse than S1).

At 420, the controller determines that spare port F should replace active port B, and that active port B should become a spare port. Active port B is uncoupled from signal port b. In some implementations, as illustrated in FIG. 4(c), the controller reidentifies second-side RF port B as a spare port (as indicated by the label "S3," although a label "S1" would also be appropriate), and reidentifies second-side RF port F as an active port (as indicated by the label "A6," although a label "A2" would also be appropriate). In some implementations, as illustrated in FIG. 4(c), the controller causes S3 to exit active service. At the end of 420, the system may be configured as illustrated in FIG. 4(c).

At 430, the controller determines that spare port F should replace active port B, and that the active piece of RF communication equipment A2 should be taken offline. Active port B is uncoupled from signal port b, and A2 is taken offline. In some implementations, the controller reidentifies second-side RF port F as an active port (as indicated by the label "A6," although a label "A2" would also be appropriate). At the end of 430, the system may be configured as illustrated in FIG. 4(d).

Figure 5:
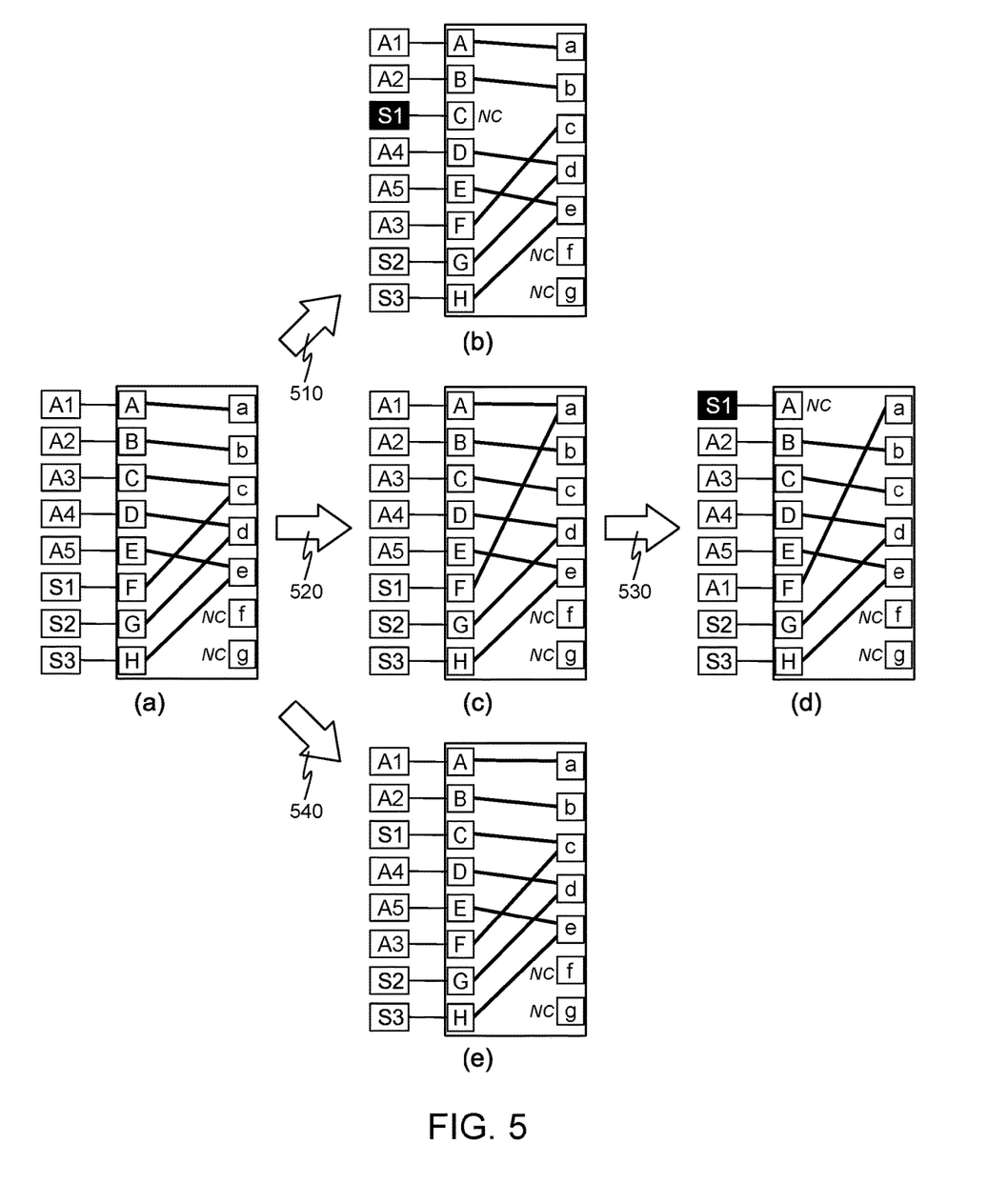
FIG. 5 illustrates various examples in which spare ports are to provide otherwise unused spare RF communication equipment as hot spares.

FIG. 5 illustrates various examples in which spare ports are to provide otherwise unused spare RF communication equipment as hot spares. FIG. 5(a) illustrates a configuration in which active port C and spare port F are simultaneously coupled to signal port c and a controller adapted to control the RF switch matrix has caused S1 to utilize the same or similar operating parameters as A3, allowing S1 to serve as a hot spare for A3. Also, active port D and spare port G are simultaneously coupled to signal port d and the controller has caused S2 to utilize the same or similar operating parameters as A4, allowing S2 to serve as a hot spare for A4. Also, active port E and spare port H are simultaneously coupled to signal port e and the controller has caused S3 to utilize the same or similar operating parameters as A5, allowing S3 to serve as a hot spare for A5. An advantage of this configuration is that active pieces of RF communication equipment A3-A5 are each effectively in a 1:1 redundant configuration, which allows, for example, S1 to very rapidly replace A3 with very little, or even no, break in communication via signal port c. In some implementations, a hot spare piece of RF communication equipment may be in a quasi-active state; for example, S2 may provide demodulated data to a downstream device. In that example, the downstream device may be configured to utilize demodulated data received from both A4 and S2 to take advantage of events such as where A4 fails to correctly receive a data portion, but S2 does correctly receive the data portion.

FIG. 5 illustrates three different sets of operations 510, 520, and 530 that may follow from the configuration illustrated in FIG. 5(a). At 510, the controller determines that spare port F should replace active port C. This may occur, for example, in response to an indication of reduced performance for A3. Active port C is uncoupled from signal port c, and active signal port C is reidentified by the controller as a spare port. The controller also causes A3 to exit active service. In some examples or circumstances, A3 may be taken offline rather than be designated a spare. Much as mentioned above, the replacement of A3 with hot slave S1 occurs very rapidly, with very little, or even no, break in communication via signal port c. At the end of 510, the system may be configured as illustrated in FIG. 5(b).

At 520, spare port F is reassigned to provide a hot spare for active port A1. This may occur, for example, in response to an indication of reduced performance for A1. Spare port F is uncoupled from signal port c, and is then coupled to signal port a, such that active port A and spare port F are simultaneously coupled to signal port a. Also, the controller causes S1 to utilize the same or similar operating parameters as A1, allowing S1 to serve as a hot spare for A1. At the end of 520, the system may be configured as illustrated in FIG. 5(c). At 530, the controller determines that spare port F should replace active port A. This occurs in much the same manner discussed with respect to the set of operation 510, which is not repeated here for brevity. At the end of 530, the system may be configured as illustrated in FIG. 5(d).

At 540, active port C and spare port F swap roles, with A3 and S1 remaining in a 1:1 redundant configuration. At the end of 540, the system may be configured as illustrated in FIG. 5(e). For example, if in the configuration illustrated in FIG. 5(a), the piece of RF communication equipment coupled to second-side RF port C initially provides demodulated data to a downstream device, then in the configuration illustrated in FIG. 5(e), the piece of RF communication equipment coupled to second-side RF port F provides demodulated data to the downstream device. In some implementations, the controller may cause A3 and S1 to modify which piece of RF communication equipment is providing demodulated data. The controller reidentifies second-side RF port C as a spare port, and reidentifies second-side RF port as an active port.

Figure 6:
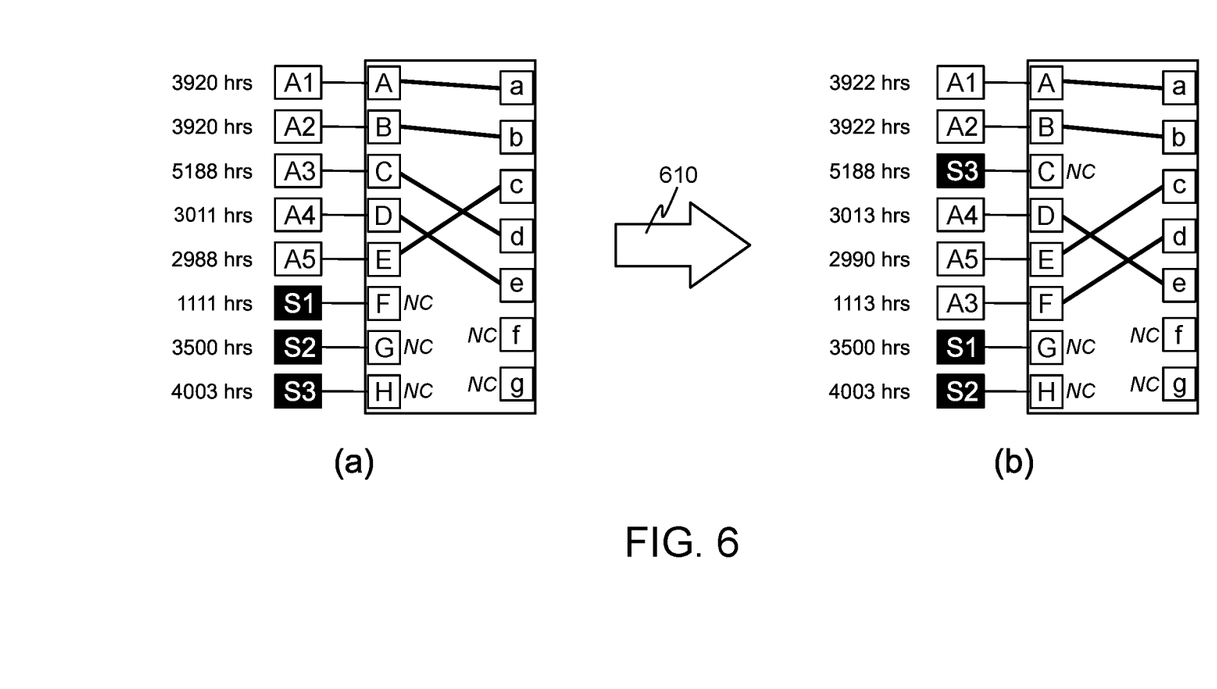
FIG. 6 illustrates an example of switching over to a spare terminal based on an amount of time a piece of RF communication equipment coupled to an active terminal has been in active service.

FIG. 6 illustrates an example of switching over to a spare port based on an amount of time a piece of RF communication equipment coupled to an active port has been in active service. The example in FIG. 6(a) shows cumulative hours that each of the pieces of RF communication equipment have been used in active service. As configured in FIG. 6(a), A1-A5 are in active service, and accordingly are continuing to accrue time, whereas S1-S3 are not in active service, and accordingly their cumulate time remains constant (while remaining not in active service).

At 610, a controller adapted to control the RF switch matrix obtains the cumulative times for each of the pieces of RF communication equipment (which, in some implementations, may be recorded and reported by pieces of RF communication equipment), and determines that A3 has the greatest amount of cumulative time, and that the cumulative time for A3 is greater than the cumulative time for S1. In some implementations, the controller may further determine S1 has the least amount of cumulative time, and select S1 based on this determination. Having identified the two second-side RF ports to swap, the controller swaps second-side RF ports C and F, much as discussed above with respect to the sets of operations 410 and 420, which is not repeated here for brevity. At the end of 610, and after a further two hours of operation, the system may be configured as illustrated in FIG. 6(b), with the pieces of RF communication equipment having the shown changes in their cumulative time of active service.

By evenly distributing the amount of active service for each of the pieces of RF communication equipment, the system can ensure that each of the pieces of RF communication equipment, including the spares, goes through a "burn-in" period of use, during which failure rates are typically higher, and avoids failure modes that may result from an extended period of non-use. This avoids a situation in which a spare fails immediately or shortly after being put into active service, and also helps identify marginal or defective pieces of RF communication equipment at an earlier time. In some implementations, the controller may no longer swap in a spare once it has accumulated a threshold amount of time of active service.

Figure 7:
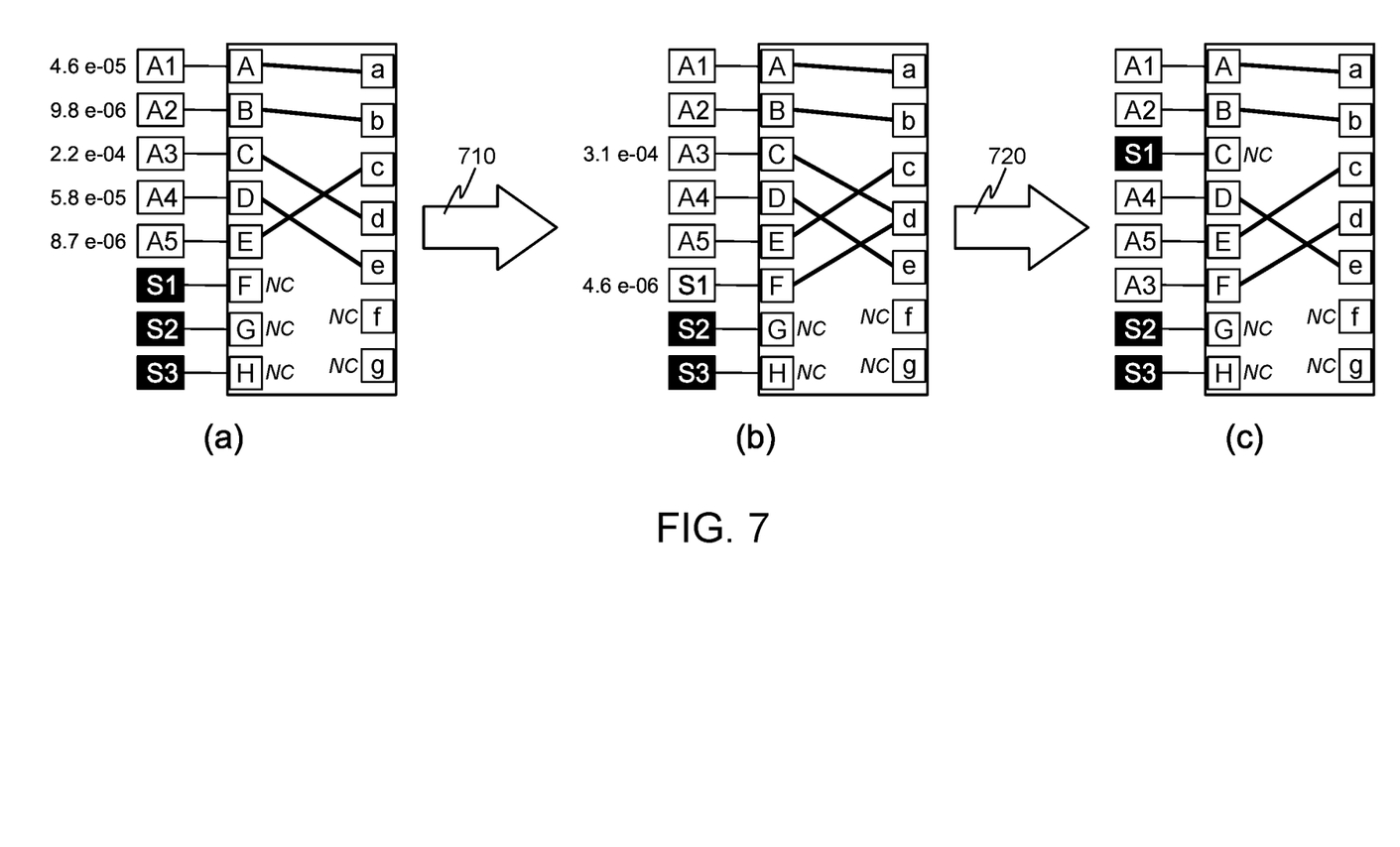
FIG. 7 illustrates an example of switching over to a spare terminal based on bit error rates for RF communication equipment coupled to the active terminals.

FIG. 7 illustrates an example of switching over to a spare port based on bit error rates (BER) for pieces of RF communication equipment coupled to the active ports. FIG. 7(a) illustrates bit error rates for each of A1-A5, which are obtained by a controller adapted to control the RF switch matrix at 710. Depending on the implementation, the bit error rate may be pre and/or post ECC or Forward EC processing. In the example illustrated in FIG. 7, A3 was the worst BER, and as a result is selected to be placed in a redundant configuration with S1. In some implementations, a threshold BER value may be used to select active pieces of RF communication equipment. For example, if a threshold BER of 5.0 e-05 were used, both A1 and A3 would be selected. In some implementations, the controller can identify and ignore fading resulting from weather by determining if the obtained bit error rates for all or most of the active pieces of RF communication equipment have also increased. In some examples or situations, the configuration may proceed directly to the configuration illustrated in FIG. 7(c) by simply swapping active port C and spare port F, as discussed above with respect to 610. Otherwise, at the end of 710, the system is configured as illustrated in FIG. 7(b).

In the configuration illustrated in FIG. 7(b), both A3 and S1 demodulate an RF stream received via signal port d. At 720, the controller obtains BER values for A3 and S1, and compare the two. The controller may determine, in response to the BER value for A3 being worse than S1, that their respective RF ports, active port C and spare port F, should be swapped. In some implementations, that determination may require that the BER value is worse than the BER value for S1 by at least a predetermined amount, such as a half or full order of magnitude (in order words, by at least a multiple of 5× or 10×). If the determination is made to swap the RF ports, the resulting configuration is illustrated in FIG. 7(c).

In some implementations, SNR (signal to noise ratio) values may be used in much the same manner discussed above for BER.

FIG. 8 is a block diagram that illustrates a computer system 800 upon which aspects of this disclosure may be implemented, such as, but not limited to, controller 260 or computer components included in pieces of RF communication equipment 210 and 215 and RFTs 220, 230, 232, and 234. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT) or liquid crystal display (LCD), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Another type of user input device is a touchscreen, which generally combines display 812 with hardware that registers touches upon display 812.

This disclosure is related to the use of computer systems such as computer system 800 for implementing the techniques described herein. In some examples, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A communication apparatus comprising:
   an M by N radio frequency (RF) switch matrix comprising N first-side RF ports and M second-side RF ports; and
   a controller, configured to interact with and control the M by N RF switch matrix,
   wherein:
      N is at least 2, and
      each of the first-side RF ports is configured to be selectively coupled and uncoupled from at least one of two or more of the second-side RF ports, in response to the controller, wherein coupled carries external RF signals between the selectively coupled first-side RF port and the at least one of two or more of the second-side RF ports, and
      wherein the controller is further configured to:
         identify one or more of the second-side RF ports as active ports, the active ports including a first active port,
         cause the M by N RF switch matrix to couple the first active port to a first signal port included in the first-side RF ports,
         obtain at least one of a first BER (bit error rate) and a first SNR (signal to noise ratio) for a first demodulation of a first RF stream received by a first piece of RF communication equipment via the first active port, and
         cause, in response to at least one of the first BER or the first SNR being different than a threshold value, the M by N RF switch matrix to couple the first signal port to a first spare port, wherein the first spare port is included in the second-side RF ports and is not included in the active ports.

2. The communication apparatus of claim 1, wherein:
the controller is further configured to cause, in response to the first BER being obtained before an ECC (error correction code) or FEC (forward error correction) processing for the first demodulation, the M by N RF switch matrix to couple the first signal port to the first spare port.

3. The communication apparatus of claim 1, wherein:
the controller is further configured to cause, in response to the first BER is obtained after an ECC (error correction code) or FEC (forward error correction) processing for the first demodulation the M by N RF switch matrix to couple the first signal port to the first spare port.

4. The communication apparatus of claim 1, the M by N RF switch matrix being configured wherein the first signal port being coupled to the first spare port couples the first active port and the first spare port simultaneously to the first signal port.

5. The communication apparatus of claim 4, wherein the BER is a first BER and is obtained for a first time or the SNR is a first SNR and is obtained for a first time, and the controller is further configured to:
obtain a second BER or a second SNR, for a second time for a second demodulation of a second RF stream received by the first piece of RF communication equipment via the first active port, while the first active port and the first spare port are simultaneously coupled to the first signal port by the M by N RF switch matrix coupling of the first signal port to the first spare port;
obtain a third BER or a third SNR, for a third time for a third demodulation of a third RF stream received by a second piece of RF communication equipment via the first spare port, while the first active port and the first spare port are simultaneously coupled to the first signal port by the M by N RF switch matrix coupling the first signal port to the first spare port; and
cause the M by N RF switch matrix to uncouple the first signal port and the first active port and reidentify the first spare port as one of the active ports in response to one of:
the second BER being worse than the third BER, or
the second SNR being worse than the third SNR.

6. The communication apparatus of claim 4, wherein the controller is further configured to:
obtain a second BER or a second SNR, for a second time for a second demodulation of a second RF stream received by the first piece of RF communication equipment via the first active port, while the first active port and the first spare port are simultaneously coupled to the first signal port by the M by N RF switch matrix coupling the first signal port to the first spare port;
obtain a third BER or a third SNR for a third demodulation of a third RF stream received by a second piece of RF communication equipment via the first spare port while the first active port and the first spare port are simultaneously coupled to the first signal port by the M by N RF switch matrix coupling of the first signal port to the first spare port; and
cause the M by N RF switch matrix to uncouple the first signal port and the first active port and reidentify the first spare port as one of the active ports in response to one of:
the second BER being worse than the third BER by at least a first predetermined amount, or
the second SNR being worse than the third SNR by at least a second predetermined amount.

7. The communication apparatus of claim 1, wherein the controller is further configured to:
obtain operating parameters for the first piece of RF communication equipment; and
cause, in response to a first indication, a second piece of RF communication equipment coupled to the first spare port to utilize the operating parameters.

8. The communication apparatus of claim 1, wherein:
the identified active ports further include a second active port different than the first active port; and
the controller is further configured to:
obtain a second BER or a second SNR, or both, for a second demodulation of a second RF stream received by a second piece of RF communication equipment via the second active port,
make a first determination, based on the first BER or the first SNR, or both, that the first piece of RF communication equipment experienced an increase in BER or a decrease in SNR,
make a second determination, based on at least one of the second BER and the second SNR, that the second piece of RF communication equipment did not experience an increase in BER or a decrease in SNR, and
cause, in response to the first determination, the second determination, and the first BER or the first SNR, or both, the M by N RF switch matrix to couple the first signal port to the first spare port.

9. The communication apparatus of claim 1, wherein the controller is further configured to select the first active port from a plurality of active ports in response to one of:
the first BER being greater than a threshold BER value, and
the first SNR being less than a threshold SNR value.

10. The communication apparatus of claim 1, wherein:
the identified active ports further include a second active port different than the first active port; and
the controller is further configured to:
obtain at least one of a second BER and a second SNR (for a second demodulation of a second RF stream received by a second piece of RF communication equipment via the second active port, and
select the first active port from the active ports in response to one of:
the first BER being greater than the second BER value, and
the first SNR being less than the second SNR value.

11. A method of operating a radio frequency (RF) system comprising:
controlling coupling and uncoupling of RF ports included in an M by N radio frequency (RF) switch matrix, the RF ports comprising N first-side RF ports and M second-side RF ports, N being at least 2, wherein the controlling includes:
identifying, among the N first-side RF ports and the M second-side RF ports, one or more of the second-side RF ports as active ports, the active ports including a first active port,
causing the M by N RF switch matrix to couple the first active port to a first signal port included in the first-side RF ports,
obtaining at least one of a first BER (bit error rate) and a first SNR (signal to noise ratio) for a first demodulation of a first RF stream received by a first piece of RF communication equipment via the first active port, and
causing, in response to at least one of the first BER or the first SNR being different than a threshold value, the M by N RF switch matrix to couple the first signal port to a first spare port, wherein the first spare port is included in the second-side RF ports and is not included in the active ports.

12. The method of claim 11, wherein:
the first BER is obtained before an ECC (error correction code) or FEC (forward error correction) processing for the first demodulation, and
the causing the M by N RF switch matrix to couple the first signal port to the first spare port controller is in response to the first BER.

13. The method of claim 11, wherein:
the first BER is obtained after an ECC (error correction code) or FEC (forward error correction) processing for the first demodulation, and
the causing the M by N RF switch matrix to couple the first signal port to the first spare port controller is in response to the first BER.

14. The method of claim 11, wherein the causing the M by N RF switch matrix to couple the first signal port to the first spare port is configured to couple the first active port and the first spare port simultaneously to the first signal port.

15. The method of claim 14, further comprising:
obtaining a second BER or a second SNR for a second time for a second demodulation of a second RF stream received by the first piece of RF communication equipment via the first active port while the first active port and the first spare port are simultaneously coupled to the first signal port and after the causing the M by N RF switch matrix to couple the first signal port to the first spare port;
obtaining a third BER or a third SNR for a third demodulation of a third RF stream received by a second piece of RF communication equipment via the first spare port while the first active port and the first spare port are simultaneously coupled to the first signal port, and the first signal port is coupled to the first spare port;
causing the M by N RF switch matrix to uncouple the first signal port and the first active port and reidentifying the first spare port as one of the active ports in response to one of:
the second BER being worse than the third BER, or
the second SNR being worse than the third SNR.

16. The method of claim 14, further comprising:
obtaining a second BER or a second SNR for a second time for a second demodulation of a second RF stream received by the first piece of RF communication equipment via the first active port while the first active port and the first spare port are simultaneously coupled to the first signal port and after the causing the M by N RF switch matrix to couple the first signal port to the first spare port;
obtaining a third BER or a third SNR for a third demodulation of a third RF stream received by a second piece of RF communication equipment via the first spare port while the first active port and the first spare port are simultaneously coupled to the first signal port, wherein the third time is after the first time and after the causing the M by N RF switch matrix to couple the first signal port to the first spare port; and
causing the M by N RF switch matrix to uncouple the first signal port and the first active port and reidentifying the first spare port as one of the active ports in response to one of:
the second BER being worse than the third BER by at least a first predetermined amount, or
the second SNR being worse than the third SNR by at least a second predetermined amount.

17. The method of claim 11, further comprising:
obtaining operating parameters for the first piece of RF communication equipment; and
causing, in response to a first indication, a second piece of RF communication equipment coupled to the first spare port to utilize the operating parameters.

18. The method of claim 11, wherein:
the identified active ports further include a second active port different than the first active port; and
the method further comprises:
obtaining at least one of a second BER and a second SNR for a second demodulation of a second RF stream received by a second piece of RF communication equipment via the second active port,
making a first determination, based on at least one of the first BER and the first SNR, that the first piece of RF communication equipment experienced an increase in BER or a decrease in SNR,
making a second determination, based on at least one of the second BER and the second SNR, that the second piece of RF communication equipment did not experience an increase in BER or a decrease in SNR, and
causing, in response to the first determination, the second determination, and at least one of the first BER or the first SNR, the M by N RF switch matrix to couple the first signal port to the first spare port.

19. The method of claim 11, further comprising selecting the first active port from a plurality of active ports in response to one of:
the first BER being greater than a threshold BER value, and
the first SNR being less than a threshold SNR value.

20. The method of claim 11, wherein:
the identified active ports further include a second active port different than the first active port; and
the method further comprises:
obtaining at least one of a second BER and a second SNR for a second demodulation of a second RF stream received by a second piece of RF communication equipment via the second active port, and
selecting the first active port from the active ports in response to one of:
the first BER being greater than the second BER value, and
the first SNR being less than the second SNR value.

* * * * *